(12) United States Patent
Szczech et al.

(10) Patent No.: US 6,361,120 B1
(45) Date of Patent: *Mar. 26, 2002

(54) BRUSH TUFTING

(75) Inventors: Gerald S. Szczech; Kenneth Bradley Wilson, both of Iowa City, IA (US)

(73) Assignee: Gillette Canada Company, Halifax, Nova Scotia ( * ) Notice: Subject to any disclaimer, the term of this patent is extended or adjusted under 35 U.S.C. 154(b) by 0 days.

This patent is subject to a terminal disclaimer.

(21) Appl. No.: 09/383,051

(22) Filed: Aug. 25, 1999

(51) Int. Cl.[7] ................................................ A46D 3/00
(52) U.S. Cl. ............................ 300/8; 425/123; 425/190
(58) Field of Search ............................ 300/4, 5, 8, 21; 425/123, 190, 805

(56) References Cited

U.S. PATENT DOCUMENTS

| | | | |
|---|---|---|---|
| 798,380 A | * | 8/1905 | Alexander |
| 2,298,156 A | * | 10/1942 | Person |
| 2,592,296 A | * | 4/1952 | Kutik |
| 3,026,146 A | * | 3/1962 | Szabo et al. |
| 3,577,843 A | * | 5/1971 | Kutik |
| 3,836,199 A | * | 9/1974 | Blankschein |
| 4,635,313 A | | 1/1987 | Fassler et al. |
| 4,893,876 A | * | 1/1990 | Weihrauch |
| 4,988,146 A | | 1/1991 | Weihrauch |
| 5,224,763 A | | 7/1993 | Dirksing |
| 5,274,873 A | | 1/1994 | Shields |
| 5,454,626 A | * | 10/1995 | Schiffer |
| 5,458,400 A | | 10/1995 | Meyer |
| 5,609,890 A | | 3/1997 | Boucherie |
| 5,802,656 A | | 9/1998 | Dawson et al. |

FOREIGN PATENT DOCUMENTS

| | | |
|---|---|---|
| DE | 4420757 A1 | 12/1995 |
| DE | 29712554 U1 | 1/1999 |
| EP | 0676268 A1 | 10/1995 |
| EP | 0972464 A1 | 1/2000 |
| JP | 46-29989 * | 8/1971 |
| JP | 09056477 * | 4/1997 |

* cited by examiner

*Primary Examiner*—Randall E. Chin
(74) *Attorney, Agent, or Firm*—David A. Hewley

(57) ABSTRACT

The composite brush mold includes a) a metallic component that includes a pattern of holes extending from a first surface of the metallic component to a second surface of the metallic component, the holes being configured to receive tufts that include at least one bristle, and b) a plastic component that includes a pattern of fingers that correspond to the pattern of holes, the fingers extending into the holes to form end walls.

23 Claims, 8 Drawing Sheets

BRUSH TUFTING

BACKGROUND OF THE INVENTION

The invention relates to tufting brushes.

Toothbrushes generally include a body having a handle portion, a head portion, and bristles extending from the head portion. The bristles can be arranged in the form of a number of tufts.

Toothbrushes are manufactured by injecting liquid plastic into a mold cavity that defines a toothbrush body. Tufts of bristles are then attached to the head portion of the toothbrush body in a process generally known as tufting. Tufting of toothbrushes can be done by stapling, hot tufting, welding or molding tufts of bristles into the toothbrush body.

SUMMARY OF THE INVENTION

The invention relates to a composite mold in which tufts of bristles can be inserted and maintained in a predetermined position while being subjected to an injection molding operation to form a brush. The composite mold includes a mold cavity defining a portion of an oral brush head.

In one aspect, the invention features a composite brush mold that includes a) a metallic component that includes a pattern of holes extending from a first surface of the metallic component to a second surface of the metallic component, in which the holes are configured to receive tufts that include at least one bristle, and b) a second component that includes a pattern of fingers that correspond to the pattern of holes, where the fingers extend into the holes to form end walls. Preferably the second component is plastic.

By using a composite mold, bristles may extend at a variety of angles to the surface of the brush head. The bristles can also extend to a variety of heights from the brush head. The ability to vary the topography of the second component while maintaining the same two-dimensional pattern at the base of the second component allows the use of multiple second components with a single metallic component.

Particular advantages exist when the second component is plastic. For example, the plastic component of the composite mold is inexpensive to manufacture and modify relative to the costs associated with manufacturing and modifying the topography in metallic molds, thus providing design flexibility. In addition, because the plastic component can be produced from a mold, the dimensions of the plastic component can be produced with excellent precision and accuracy. The plastic component also can be replaced when it wears out or is no longer working, and the metallic component, which may have a longer useful life, can be reused.

The properties of the plastic component enable the plastic component to maintain a sufficiently tight relationship with the metallic component when the two components are mated, while allowing the easy separation of the two components when disassembly is desired. The ability to disassemble the composite mold enables the mold and the holes therein to be easily cleaned.

In one embodiment, the metallic component further includes a cavity located at the first surface of the metallic component such that the holes extend from the cavity, and the cavity defines a portion of an oral brush from which tufts of bristles extend. In some embodiments, the mold further includes a plurality of cavities located at the first surface of the metallic component such that the pattern of holes extends from the cavities to the second surface.

In other embodiments, the pattern of holes includes a first plurality of holes and a second plurality of holes. The plastic second component can further include a first component that includes a plurality of fingers dimensioned to be inserted into the first plurality of holes, and a second component that includes a plurality of fingers dimensioned to be inserted into the second plurality of holes.

In another embodiment, the first plurality of holes extend at a first angle to the first surface, and the second plurality of holes extend at a second angle to the first surface, the second angle being different from the first angle.

In some embodiments, the first plurality of holes have a first cross-section, and the second plurality of holes have a second cross-section, where the first cross-section is different from the second cross-section.

In preferred embodiments, the composite mold is dimensioned to be inserted into an apparatus for manufacturing oral brushes. The mold can further include a plurality of the metallic components, a plurality of the second components, or a combination thereof.

In another aspect, the invention features a method for forming a brush where the method includes contacting a first end of a tuft of bristles extending from a hole in the above-described composite mold with molding compound to form a brush.

Other features of the invention will be apparent from the following description of the preferred embodiments thereof, and from the claims.

BRIEF DESCRIPTION OF THE DRAWING

FIG. 5B is a view taken in cross-section along line A–A' of the second component of FIG. 5a.

DESCRIPTION OF THE PREFERRED EMBODIMENT

Figure 1:
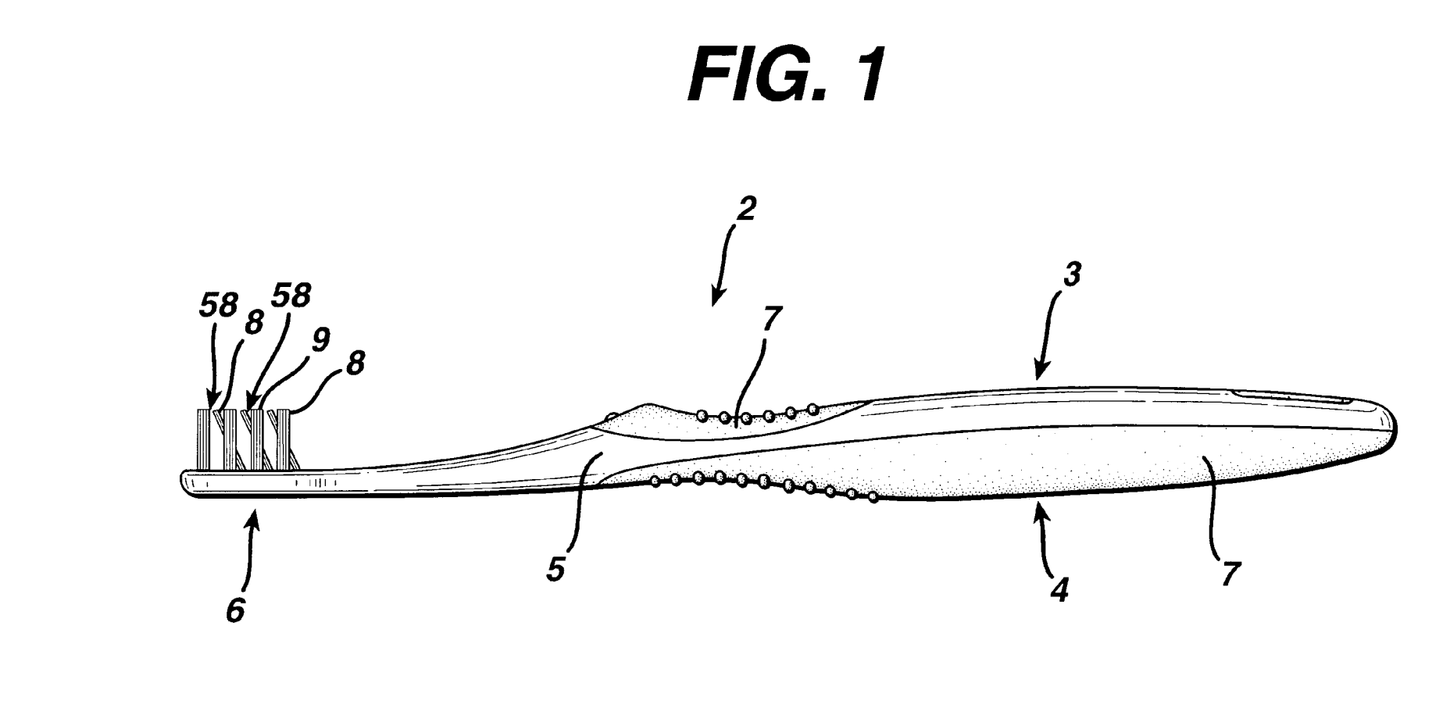
FIG. 1 is a side view of a toothbrush body.

Referring to FIG. 1, toothbrush 2 includes toothbrush body 3 that includes handle portion 4, and head portion 6. Tufts 8, which include at least one bristle 9, extend from head portion 6. The bristles 9 of the toothbrush can be of a variety of dimensions, shapes, colors, and compositions. Toothbrush body 3 can further include a base member 5, e.g., a portion made from a relatively harder, more rigid plastic such as polypropylene, and a gripping member 7, e.g., a portion made from a relatively rubbery material such as, e.g., styrene-butadiene-styrene copolymer. Multiple component toothbrush bodies are described in, e.g., U.S. Pat. No. 5,791,958, and U.S. application Ser. No. 09/293,262 filed Apr. 16, 1999, now pending and Ser. No. 09/293,019 filed Apr. 16, 1999, now pending and incorporated herein.

As shown in FIGS. 2–11, a composite mold 10 includes a metallic component 12 having holes 20 for receiving tufts 8, and a second component 14 mated to the metallic component 12 for arresting the travel of the tufts 8 through the holes 20 such that an inserted tuft 8 does not exit the composite mold 10. The individual fingers 32 of the second component 14 also establish the tuft topography of the brush 2 produced therefrom as described in more detail below.

Figure 2:
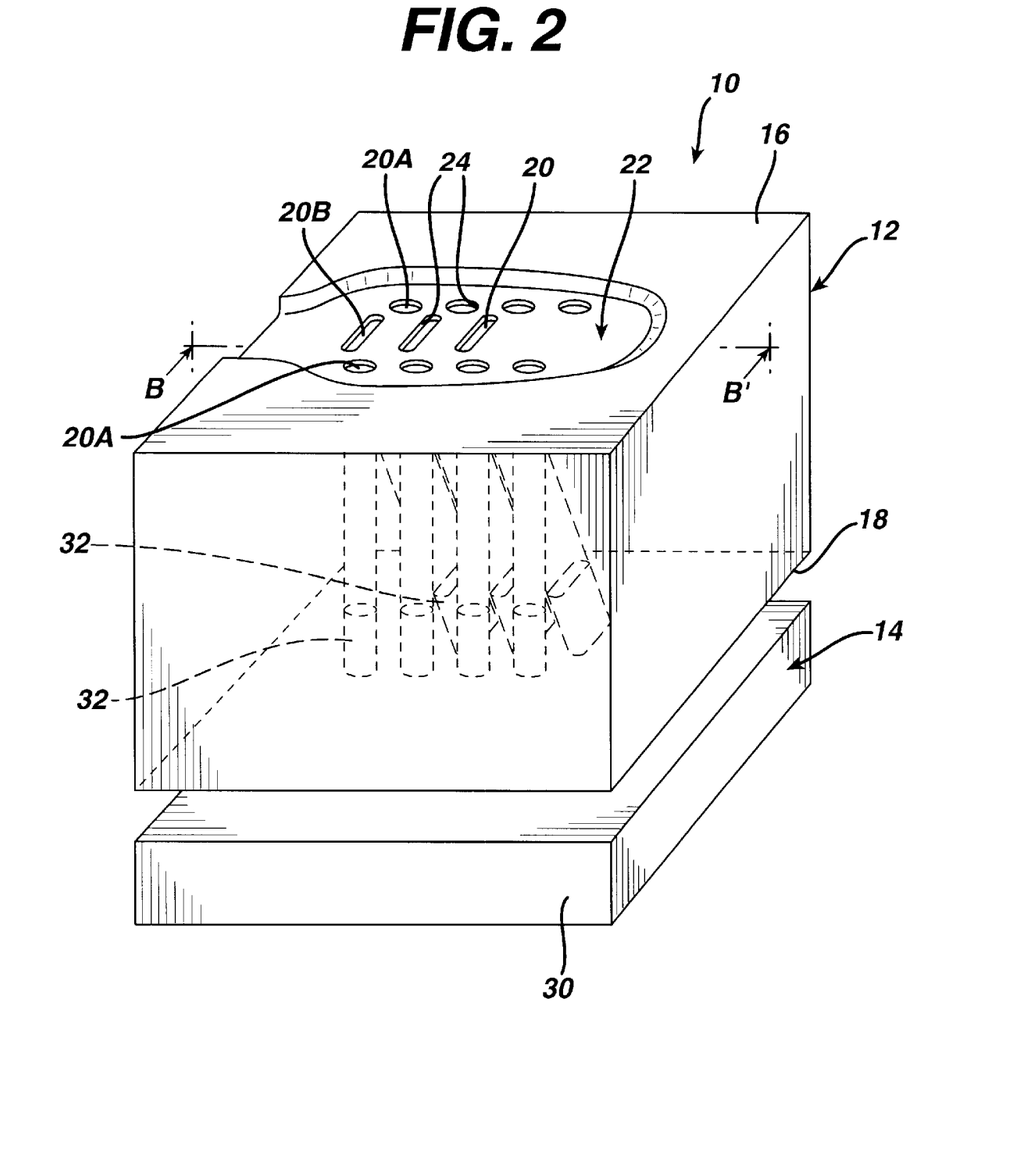
FIG. 2 is a perspective side view of a composite mold according to one embodiment of the invention with dotted lines indicating the extension of holes through the metallic component of the mold.
Figure 3A:
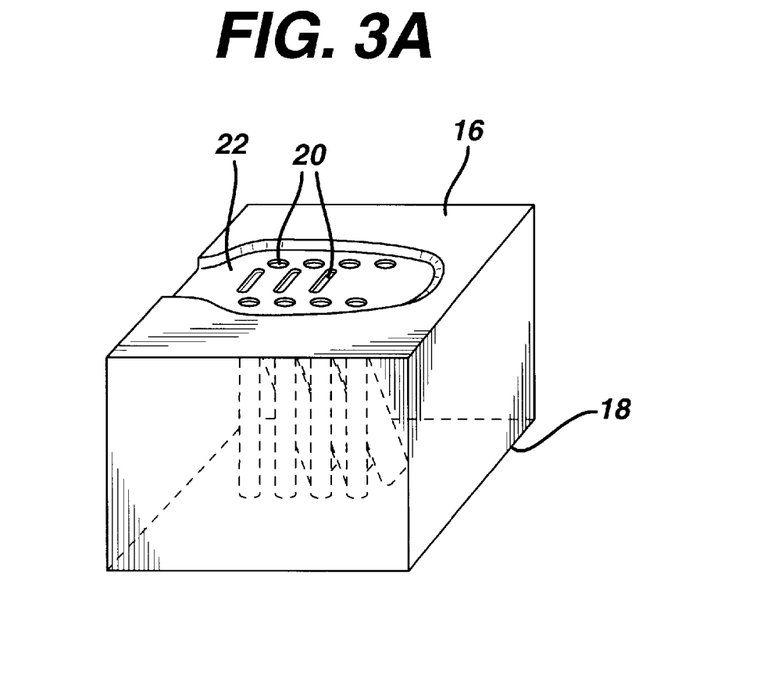
FIG. 3A is a perspective side view of the metallic component of the composite mold of FIG. 2.
Figure 3B:
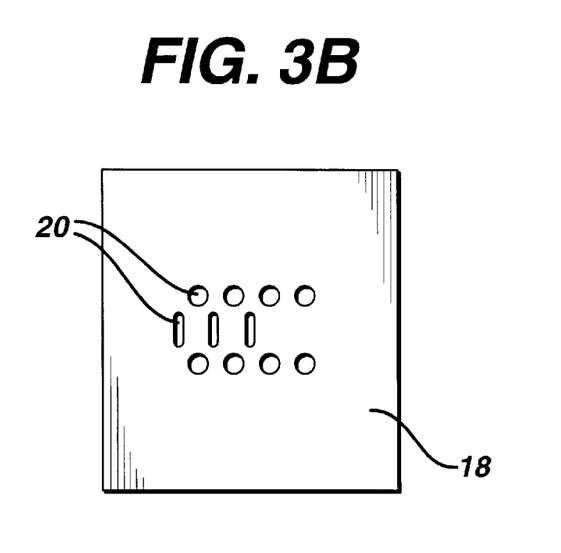
FIG. 3B is a bottom view of the metallic component of FIG. 3A.
Figure 4:
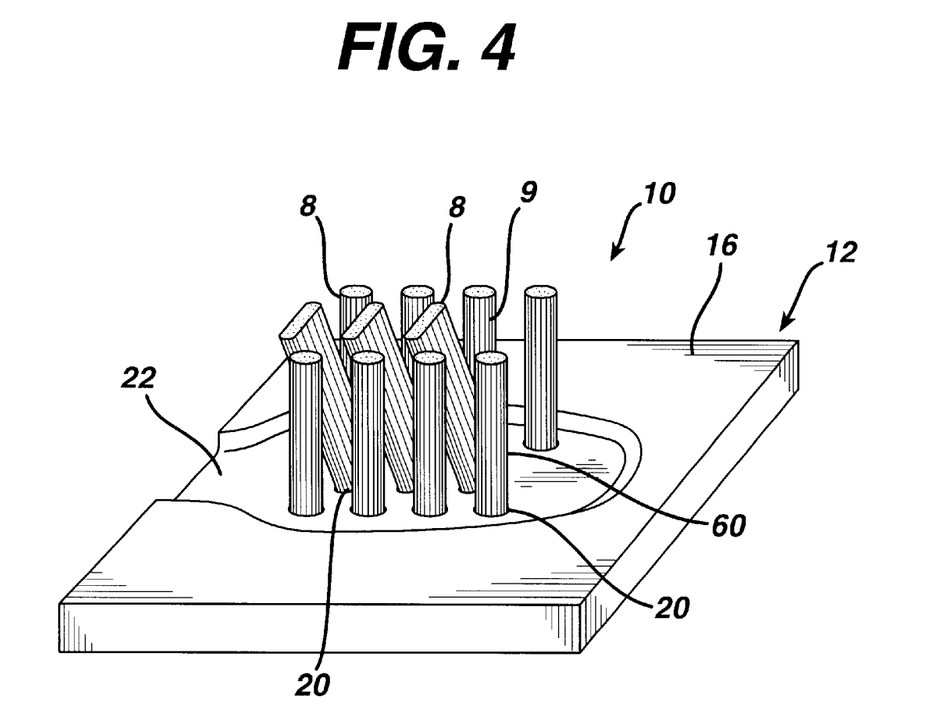
FIG. 4 is a perspective top view of the metallic component of FIG. 3A filled with tufts.

The metallic component 12 has a first surface 16 and a second surface 18. The first surface 16 includes a mold cavity 22 dimensioned to define a portion of a toothbrush body 3, e.g., a portion of the head 6 of a toothbrush 2. The mold cavity 22 is constructed to be mated with a second mold cavity 26 defined by a mold half 64, to more completely define the toothbrush body 3 to be manufactured using the composite mold 10, as described in greater detail below with respect to FIG. 9.

Holes 20 defined by the side walls 24 of metallic component 12 extend from the first surface 16 of the metallic component 12 to the second surface 18 of the metallic component 12. The holes 20 are arranged in a pattern and dimensioned to correspond to the arrangement and dimensions of the tufts 8 of the oral brush 2 to be manufactured using the composite mold 10. Each hole 20 is dimensioned to receive a tuft 8 and will hereinafter be referred to as a "tuft hole." The tuft holes 20 can extend into the metallic component 12 at a variety of angles to the first surface 16 of the metallic component 12. For example, the tuft holes 20A at the exterior of the pattern of holes can extend substantially vertically (i.e., 90°) into the metallic component 12, and the tuft holes 20B at the interior portion of the pattern can extend at an angle that is less than 90° (e.g., 45°) from the surface 16 of the metallic component 20.

The metallic component 12 can include a variety of differently dimensioned holes 20 having a variety of differently shaped cross-sections, which define shapes such as, e.g., circle, ellipse, oval, star, triangle, square, rectangle, rhombus, pentagon, hexagon, and crescent, and bisected shapes. Referring to FIG. 2, the exterior tuft holes 20A are generally cylindrical and thus have a circular cross-section, and the interior tuft holes 20B are generally elliptical in cross-section.

Referring also to FIGS. 2, and 5–8, the second component 14 includes a base 30 and fingers 32 extending from a first surface 34 of the base 30 and terminating at a first end 36. The fingers 32 are dimensioned and positioned on the base 30 to correspond to the tuft hole 20 pattern of the metallic component 12 such that the fingers 32 of the second component 14 can be inserted into the tuft holes 20 from the second surface 18 of the metallic component 12 where the first end 36 of the finger 32 forms an end wall 38 in the tuft holes 20. The fingers 32 thus prevent a tuft 8 that has been inserted into the tuft hole 20 from the first surface 16, from exiting the tuft hole 20 at the second surface 18 of the metallic component 12.

Figure 5A:
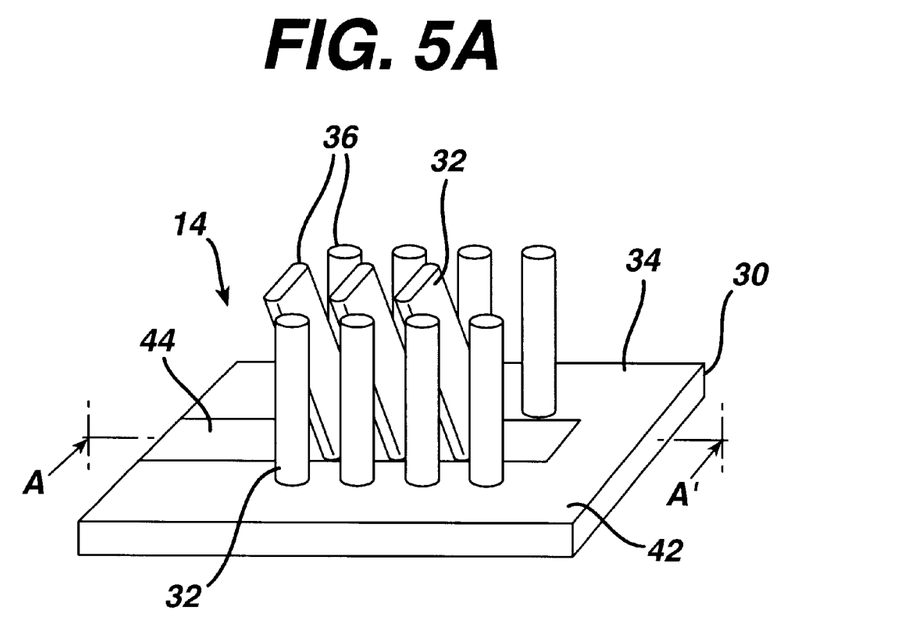
FIG. 5A is a perspective side view of the second component of the composite mold of FIG. 2.
Figure 5B:
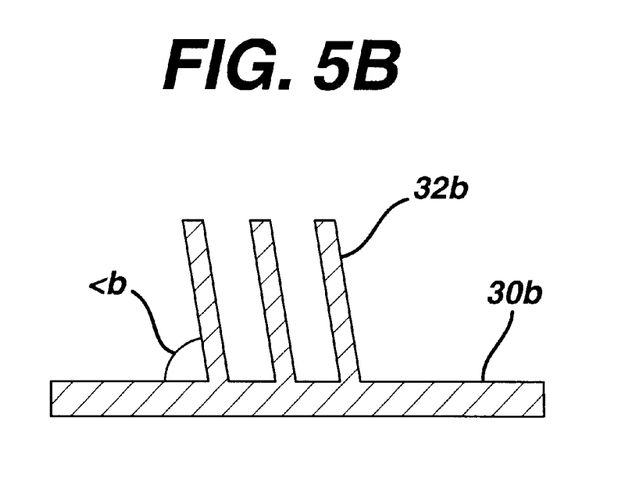

The fingers 32 extend away from the base 30 and into the tuft holes 20 by different distances. The distance a finger 32 extends into a tuft hole 20 will define the distance a corresponding tuft 8 will extend from a brush molded therefrom. The extent to which individual fingers 32 extend into tuft holes 20 can be varied to provide the desired surface contour (i.e., topography) of the brushing surface of a brush molded therewith.

Fingers 32 can also include a tip 56. Tip 56 can facilitate retention of a tuft 8 in the tuft hole 20. When a tuft 8 is inserted into a tuft hole 20, tip 56 aids in creating a pressure fit between the bristle(s) 9 of the tuft 8 and the side walls defining the tuft hole 20. The pressure fit aids in maintaining the tuft 8 in the tuft hole 20. Tip 56 also aids in maintaining the position of the tuft 9 in the molded brush 2 throughout the brush making process including, e.g., molding and transport operations.

Figure 6:
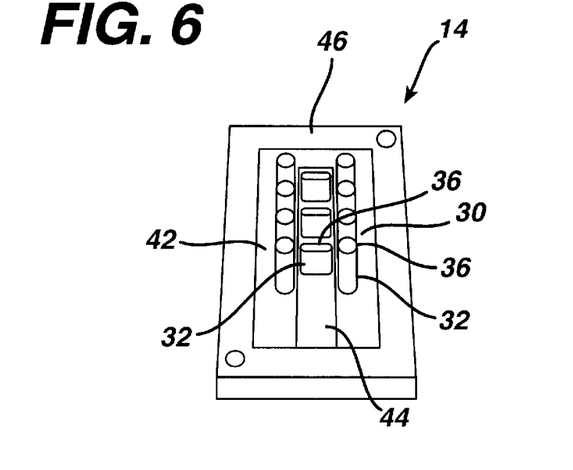
FIG. 6 is a perspective view of the second component of FIG. 5 rotated 90° and including a cover.
Figure 7:
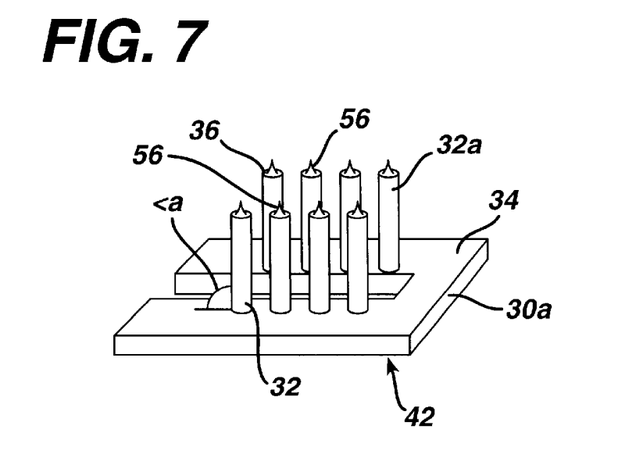
FIG. 7 is an enlarged perspective top view of a subpart of the second component of FIGS. 5 and 6.
Figure 8:
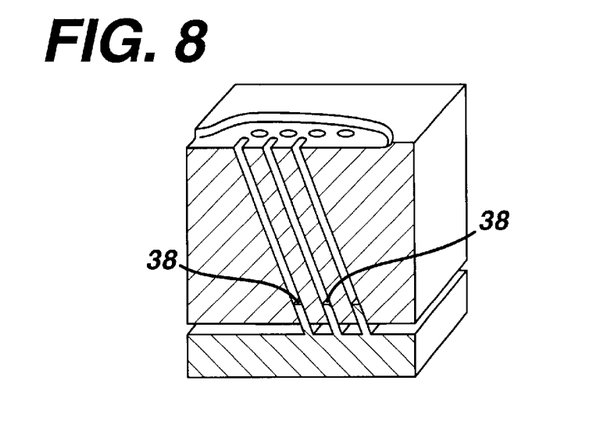
FIG. 8 is a view taken in cross-section along line B–B' of FIG. 2.

The second component 14 can also include a number of subparts 42 and 44, which can include a variety of differently dimensioned fingers 32. Referring to FIGS. 5–7, subpart 42 includes a number of fingers 32a extending at a first angle ∠a to the surface of the base 30a of subpart 42. Similarly, subpart 44 includes a number of fingers 32b extending at a second angle ∠b (different from the first angle) to the surface of the base 30b of subpart 44. Preferably the subparts interlock with each other.

The second component 14 can be capable of being secured to the metallic component 12. The second component 14 can also include a cover 46 for maintaining the subparts 42 and 44 of the second component 14 in fixed relationship with each other and for use in securing the second component 14 in position against the metallic component 12. Cover 46 can fit over the base 30 of second component 14 and can be secured to metallic component 12 at surface 18. Any suitable mechanism for securing the second component 14 (e.g., base 30) or the cover 46 in position against the metallic component 12 can be used including, e.g., screwing, clipping, snapping, and gluing, and combinations thereof, the cover 46 into position. Preferably the cover 46 can be easily removed from and secured to the metallic component 12.

Suitable second components can be made from a variety of materials including metal and plastic. Preferably the second component is a plastic that includes a polymer, e.g., thermoset polymers, thermoplastic polymers, thermoplastic elastomeric polymers, rubber polymers and combinations thereof. Preferred polymers include polyurethane and polyolefins, e.g., polyethylene and polypropylene.

Figure 10:
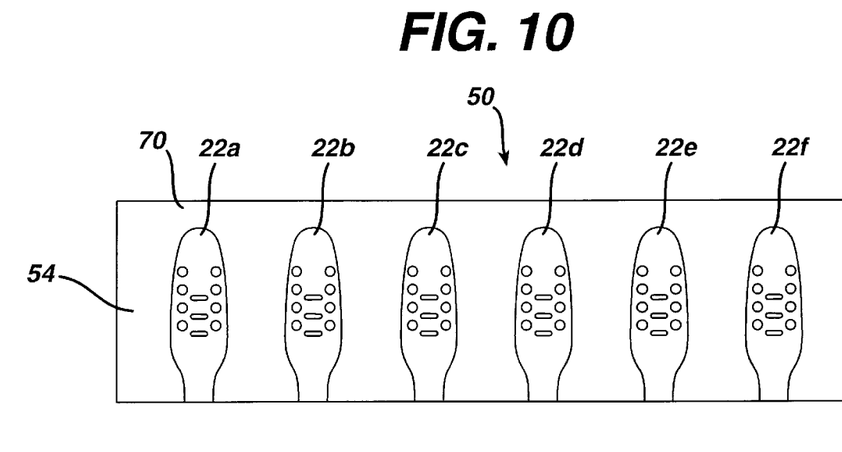
FIG. 10 is a top view of a composite mold according to a second embodiment of the invention.
Figure 11:
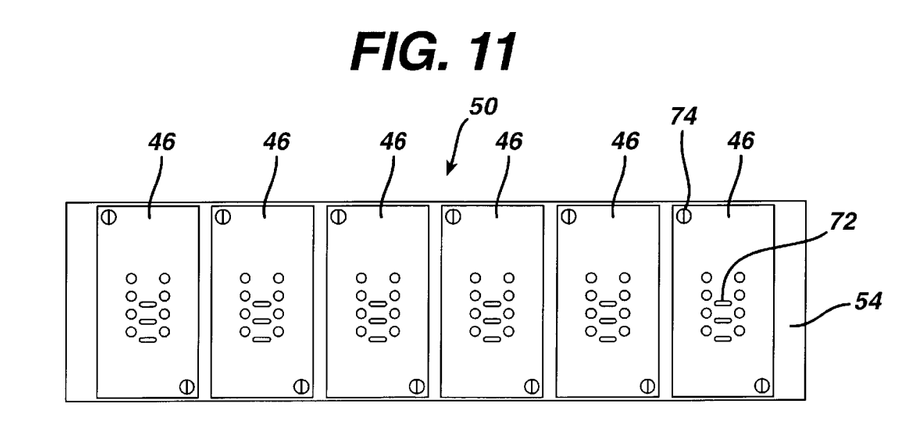
FIG. 11 is a bottom view of the composite mold of FIG. 10.

Referring to FIGS. 10 and 11, an embodiment of the composite mold 50 includes a metallic component 70 in the form of a metal bar 54 that includes a number of cavities 22a–f, each of which defines a portion of the bristle receiving portion (i.e., head portion 6) of a toothbrush 2. The cavities 22a–f are arranged in a row on the metallic component 70. Composite mold 50 also includes a number of second components 72 corresponding to the number of tuft hole patterns on the metallic component 70. The second components 72 of the composite mold 50 are held in place by cover 46, which is secured in position against metallic bar 54 by screws 74.

The composite mold is constructed such that it can be transferred to and from the various operations in the brush making process, e.g., tufting and brush molding operations. In addition, the composite mold is capable of being inserted into an apparatus for molding brushes, e.g., an injection molding apparatus for molding multiple toothbrushes, such that it forms a portion of the mold.

Referring to FIGS. 2, 4, 8 and 9, during the tufting operation, one end 58 of a tuft 8 is inserted into a tuft hole 20 to a depth defined by the end wall 38 formed by end 36 of finger 32, such that the opposite end 60 of the inserted tuft 8 extends from the composite mold 10 to form a tuft filled composite mold. The tufts can be inserted into the composite mold according to a variety of techniques including, e.g., manually or in an automated operation such as, e.g., applying pneumatic pressure to propel a tuft along a tube and into the target tuft hole, placing picked bristles or tufts into the tuft holes using a robotic arm and combinations thereof.

Figure 9:
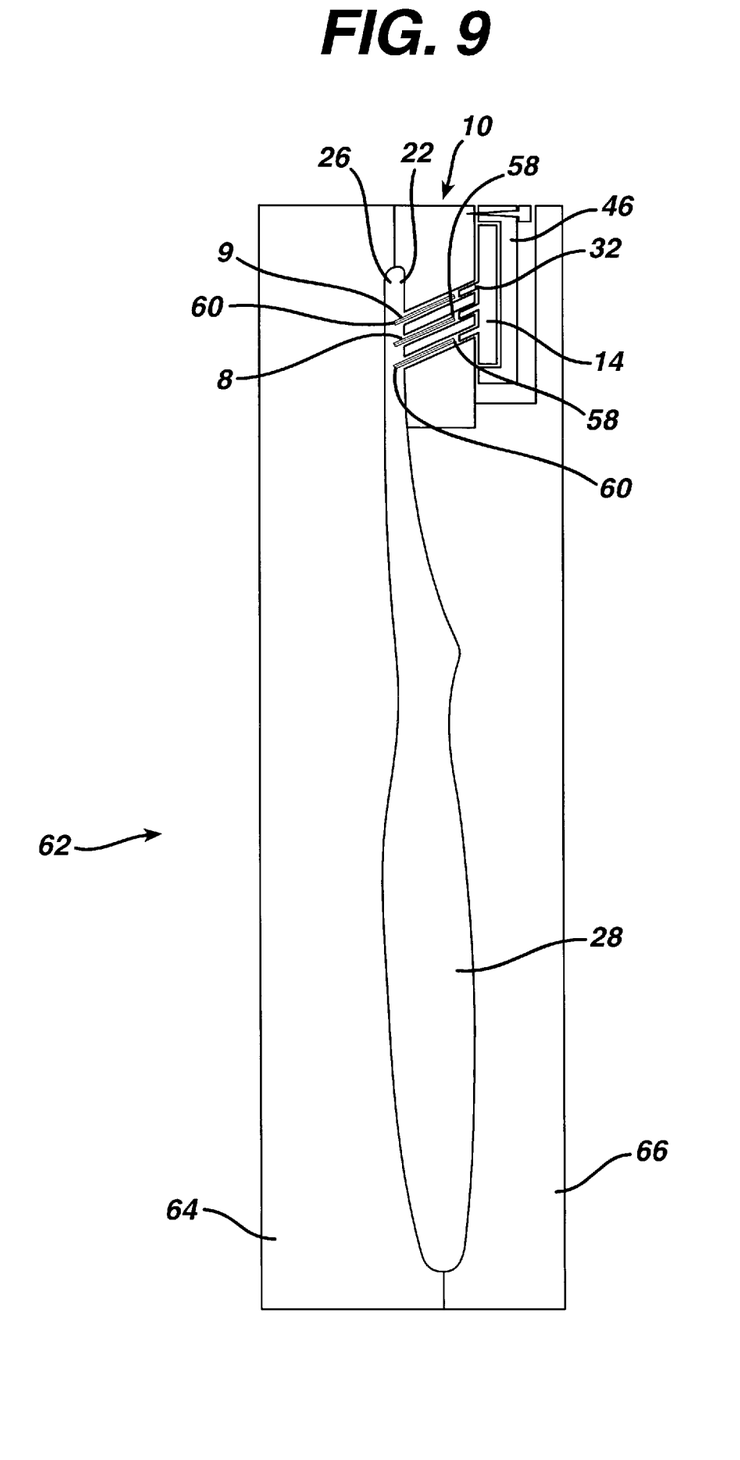
FIG. 9 is a view taken in cross-section of a portion of a toothbrush molding apparatus that includes the composite mold of FIG. 2.

The tuft 8 filled composite mold 10 is then inserted into an apparatus 62 for molding brush bodies 3, as shown in FIG. 9. Brush molding apparatus 62 includes a first mold half 64 defining cavity 26 and a second mold half 66 defining cavity 28, which, when combined with composite mold cavity 22, define a toothbrush body 3. During the molding process, molding compound, e.g., polypropylene, is injected into cavities 28, 26, and 22 such that tuft ends 60 that extend from the composite mold 10 become embedded in the molding compound located in the head portion 6 of the brush body 3. When the molding operation is complete, the composite mold 10 and the toothbrush 2 formed thereby can be separated, whereupon the tuft ends 58 that had been within the tuft holes 20 of composite mold 10 become free and available for brushing an oral surface, e.g., teeth or gums.

Other embodiments are within the claims. For example, although the second surface 18 of composite mold 10 has been shown as being opposite the first surface 16, it is contemplated that the second surface 18 could be other than opposite the first surface 16. The composite mold can also include any number of mold cavities and second components including a unitary plastic component that includes a number of fingers corresponding to a number of tuft hole patterns.

What is claimed is:

1. A composite brush mold comprising:
    a) a metallic component comprising a pattern of holes extending from a first surface of said metallic component to a second surface of said metallic component, the holes being configured to receive tufts comprising at least one bristle; and
    b) a plastic component comprising a pattern of fingers that correspond to said pattern of holes, said fingers extending into said holes to form end walls.

2. The mold of claim 1, wherein said metallic component further comprises a cavity located at said first surface of said metallic component such that said holes extend from said cavity, said cavity defining a portion of an oral brush from which tufts of bristles extend.

3. The mold of claim 1, wherein said plastic component further comprises a base, a first finger extending from said base at a first angle to said base, and a second finger extending from said base at a second angle to said base, said second angle being different from said first angle.

4. The mold of claim 1, further comprising a cover positioned to maintain said fingers in position within said metallic component.

5. The mold of claim 4, wherein said cover comprises plastic.

6. The mold of claim 1, wherein at least one of said holes, when taken in cross-section, defines a shape selected from the group consisting of a circle, triangle, square, rectangle, rhombus, ellipse, star, oval, and crescent.

7. The mold of claim 1, wherein said pattern of holes comprises a first plurality of holes and a second plurality of holes.

8. The mold of claim 7, wherein said plastic component further comprises
    a first component comprising a plurality of fingers dimensioned to be inserted into said first plurality of holes, and
    a second component comprising a plurality of fingers dimensioned to be inserted into said second plurality of holes.

9. The mold of claim 7, wherein said first plurality of holes extend at a first angle to said first surface, and said second plurality of holes extend at a second angle to said first surface, said second angle being different from said first angle.

10. The mold of claim 7, wherein said plastic component comprises
    a base;
    a first plurality of fingers extending from said base at an angle corresponding to said angle of said first plurality of holes; and
    a second plurality of fingers extending from said base at an angle corresponding to said angle of said second plurality of holes.

11. The mold of claim 7, wherein said first plurality of holes have a first cross-section, and said second plurality of holes have a second cross-section, said first cross-section being different from said second cross-section.

12. The mold of claim 11, wherein said plastic component further comprises
    a first subpart comprising a plurality of fingers corresponding to said first plurality of holes; and
    a second subpart comprising a base and a plurality of fingers corresponding to said second plurality of holes.

13. The mold of claim 11, wherein said first plurality of holes are circular in cross-section.

14. The mold of claim 11, wherein said first plurality of holes are elliptical in cross-section.

15. The mold of claim 11, wherein said first plurality of holes are circular in cross-section and said holes of said second plurality of holes are elliptical in cross-section.

16. The mold of claim 7, wherein said first plurality of holes are different from said second plurality of holes, said plastic component further comprising:

a first subpart comprising a base and a plurality of fingers corresponding to said first plurality of holes; and a second subpart comprising a base and a plurality of fingers corresponding to said second plurality of holes.

17. The mold of claim 1, wherein said composite mold is dimensioned to be inserted into an apparatus for manufacturing oral brushes.

18. The mold of claim 1, further comprising a plurality of said metallic components.

19. The mold of claim 1, further comprising a plurality of said plastic components.

20. The mold of claim 1, further comprising a plurality of cavities located at said first surface of said metallic component such that said pattern of holes extends from said cavities to said second surface, said cavities defining a portion of an oral brush from which tufts extend.

21. The mold of claim 19, further comprising a plurality of said plastic components.

22. The composite of claim 1, wherein at least one of said holes of said pattern of holes is a bisected oval in cross-section.

23. The mold of claim 1, wherein said plastic component comprises a polymer selected from the group consisting of polyethylene, polypropylene, polyurethane, and combinations thereof.

* * * * *